United States Patent [19]

Sedy

[11] Patent Number: 5,370,403
[45] Date of Patent: Dec. 6, 1994

[54] NON-CONTACTING FACE SEAL

[75] Inventor: Josef Sedy, Mount Prospect, Ill.

[73] Assignee: Durametallic Corporation, Kalamazoo, Mich.

[21] Appl. No.: 991,315

[22] Filed: Dec. 16, 1992

[51] Int. Cl.⁵ ............................................. F16J 15/34
[52] U.S. Cl. ...................................... 277/85; 277/157
[58] Field of Search .................. 277/38, 81 R, 85, 86, 277/87, 92, 157, 163, 164

[56] References Cited

U.S. PATENT DOCUMENTS

| | | | |
|---|---|---|---|
| 3,245,692 | 4/1966 | Voitik | 277/40 |
| 3,275,334 | 9/1966 | Voitik | 277/41 |
| 3,322,430 | 5/1967 | Voitik | 277/41 |
| 3,592,479 | 7/1971 | Andresen | 277/87 X |
| 3,647,227 | 3/1972 | Lojkutz et al. | 277/87 X |
| 3,838,864 | 10/1974 | Gegenheimer et al. | 277/163 |
| 4,072,245 | 2/1978 | Sloan, Jr. | 277/206 R X |
| 4,655,462 | 4/1987 | Balsells | 277/164 |
| 4,768,790 | 9/1988 | Netzel et al. | 277/81 R |
| 5,058,905 | 10/1991 | Nosowicz et al. | 277/81 R X |
| 5,071,141 | 12/1991 | Lai et al. | 277/81 R X |
| 5,149,249 | 9/1992 | Schellong et al. | 277/85 X |
| 5,172,918 | 12/1992 | Pecht et al. | 277/85 X |
| 5,174,584 | 12/1992 | Lahrman | 277/85 X |

FOREIGN PATENT DOCUMENTS

| | | | |
|---|---|---|---|
| 1905593 | 6/1970 | Germany | 277/84 |
| 0819082 | 8/1959 | United Kingdom | 277/163 |
| 1188859 | 4/1970 | United Kingdom | 277/85 |

Primary Examiner—William A. Cuchlinski, Jr.
Assistant Examiner—John L. Beres
Attorney, Agent, or Firm—Flynn, Thiel, Boutell & Tanis

[57] ABSTRACT

A non-contacting face seal for shafts rotating at high speeds with improved secondary sealing means for low axial drag forces. Secondary sealing means comprise an O-ring with a compliant spring element at its outer circumference.

Compliant spring provides a controlled radial force, which keeps the secondary seal in a more reliable sealing contact with the seal ring and the seal housing balance surface but avoids excessive radial forces, typical for secondary seal located between two machined cylindrical surfaces. Low axial drag forces due to secondary seal displacements are important for prevention of sealing face hang-up and consequent high leakage condition.

6 Claims, 3 Drawing Sheets

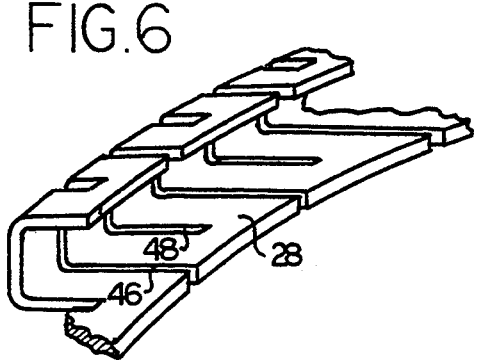
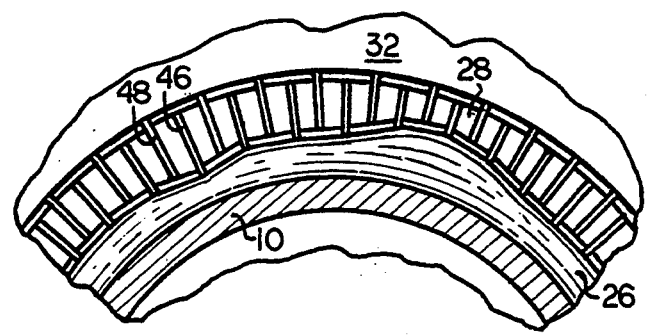
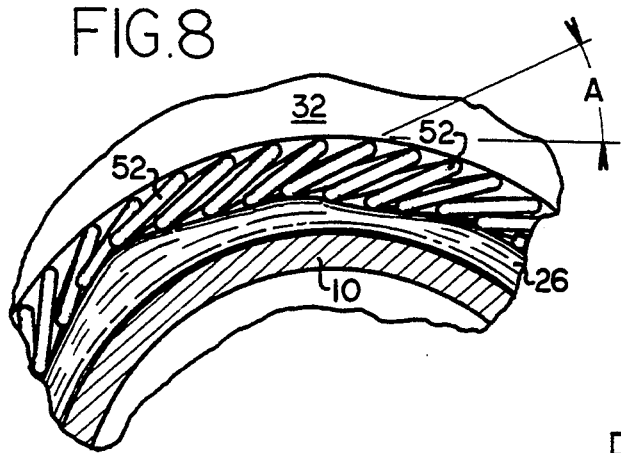
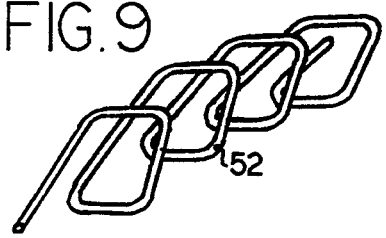
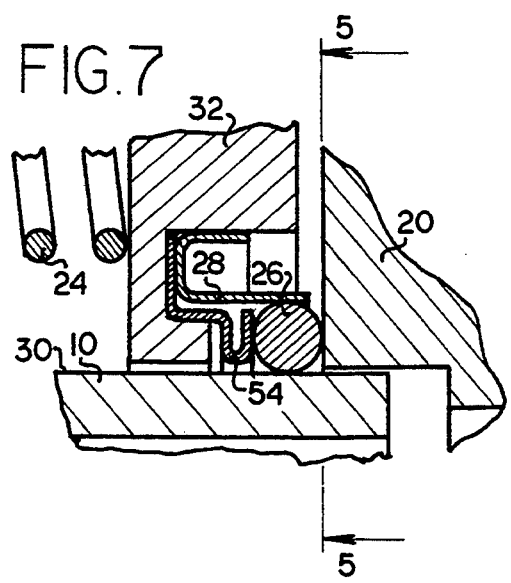

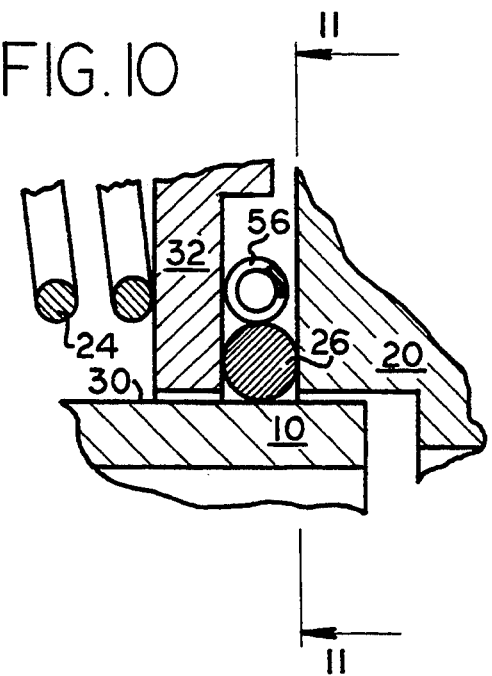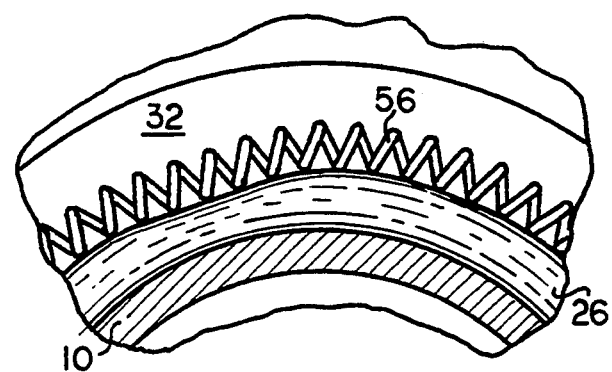

NON-CONTACTING FACE SEAL

This invention relates to sealing devices for rotating shafts where fluid is employed to generate pressure forces between interacting face-type sealing elements, where one is stationary and the other rotating. These forces provide for slight separation and non-contacting operation of the above sealing elements, thereby minimizing face wear and friction losses while maintaining low fluid leakage.

BACKGROUND OF THE INVENTION

Non-contacting face seals are usually applied to high-speed, high-pressure rotating equipment, where the use of ordinary mechanical face seals with face contact would result in excessive generation of heat and wear. Non-contacting operation avoids this undesirable face contact when the shaft is rotating above a certain minimum speed, which is often called a lift-off speed.

As with ordinary mechanical seals, a non-contacting face seal consists of two sealing rings, each of which is provided with a very precisely finished sealing surface. These surfaces are perpendicular to and concentric with the axis of rotation. Both rings are positioned adjacent to each other with the sealing surfaces in contact at conditions of zero pressure differential and zero speed of rotation. One of the rings is normally fixed to the rotatable shaft, the other located within the seal housing structure and allowed to move axially. To enable axial movement of the sealing ring and yet prevent leakage of the sealed fluid, a sealing element is placed between the ring and the housing. This sealing element must permit some sliding motion while under pressure, therefore normally a top quality O-ring is selected for that duty. This O-ring is often called the secondary seal.

To achieve non-contacting operation of the seal, one of the two sealing surfaces in contact is usually provided with shallow surface recesses, which act to generate pressure fields that force two sealing surfaces apart. When the magnitude of the forces resulting from these pressure fields is large enough to overcome the forces that urge seal faces closed, the sealing surfaces will separate and form a clearance, resulting in non-contacting operation. The character of the separation forces is such that their magnitude decreases with the increase of face separation. Opposing or closing forces, on the other hand, depend on sealed pressure level and as such are independent of face separation. They result from the sealed pressure and the spring force acting on the back surface of the axially movable sealing ring. Since the separation or opening force depends on the separation distance between sealing surfaces, during the operation of the seal or on imposition of sufficient pressure differential equilibrium separation between both surfaces will establish itself. This occurs when closing and opening forces are in equilibrium and equal to each other. Equilibrium separation constantly changes within the range of gaps. The goal is to have the low limit of this range above zero. Another goal is to make this range as narrow as possible, because on its high end the separation between the faces will lead to increased seal leakage. Since non-contacting seals operate by definition with a clearance between sealing surfaces, their leakage will be higher then that of a contacting seal of similar geometry. Yet, the absence of contact will mean zero wear on the sealing surfaces and therefore a relatively low amount of heat generated between them. It is this low generated heat and lack of wear that enables the application of non-contacting seals to high-speed turbomachinery, where the sealed fluid is gas. Turbocompressors are used to compress this fluid and since gas has a relatively low mass, they normally operate at very high speeds and with a number of compression stages in series.

During a typical period of operation, a turbocompressor is started and the power unit starts the shaft rotating. At the initial warm-up stage of operation, shaft speeds may be quite low. Typically, oil is used to support the shaft at its two radial bearings and one thrust bearing. Oil warms up in oil pumps and also accepts shear heat from compressor bearings. The oil together with process fluid turbulence and compression in turn warm-up the compressor. Once the full operating speed is reached, the compressor reaches in time some elevated equilibrium temperature. On shutdown, shaft rotation stops and the compressor begins to cool down. In this situation, various components of the compressor cool down at different rates and, importantly, the shaft contracts with decreasing temperature at a different rate than the compressor casing. The net result of this at the seal is the axial creeping motion of the shaft and the seal parts fixed to it, which may move the rotatable sealing face away from the stationary sealing face. With often only a spring load behind the stationary sealing ring, the stationary sealing face may not be able to follow the retracting rotating face, if the above mentioned secondary seal has too much friction. These prior art secondary seal arrangements can be found for example in U.S. Pat. Nos. 4,768,790; 5,058,905 or 5,071,141. The term used often in the industry for this phenomenon is "seal face hang-up". In such case there may be a very high leakage of process fluid the next time the compressor is restarted and often in such cases the seal will resist all attempts to reseal it. The seal must then be removed and replaced at a considerable cost in time and lost production.

SUMMARY AND OBJECT OF THE INVENTION

This invention is aimed at the reduction of friction forces at the secondary seal to prevent its excessive drag and thus the hang-up of the axially movable seal face, causing high process fluid leakage. These friction forces cannot be lowered beyond a certain value with prior art arrangements, where typically an O-ring or a similar elastomer seal would be placed between two cylindrical surfaces. While these surfaces can be machined with a high degree of accuracy to provide for uniform radial clearance to accept the seal, the elastomer-type secondary seal itself is typically quite non-uniform in its cross-section. To eliminate the possibility of leakage, it is then necessary to design the radial clearance for this seal narrower than what is the dimension of the secondary seal at its thinnest point. Given the relatively high non-uniformity of O-ring or similar seal cross-sections, this results in considerable squeeze in areas where the secondary seal is thicker, therefore in considerable friction and drag.

Another aim of the invention is to assure a reliable sealing contact despite secondary seal cross-section non-uniformities. The improvement this invention provides is a compliant spring element at the O-ring or similar secondary seal. The prior art requirement to squeeze the secondary seal into a uniform radial gap with the consequence of high friction forces is thus eliminated. Circumferential compliance of the spring enables the spring to place a considerably lower and more uniform load onto the secondary seal, a load which is relatively independent of variations in the secondary seal cross-section. This results in dramatically lower friction and drag forces and therefore a lesser danger of the seal face hang-up, resulting in a more reliable sealing action.

BRIEF DESCRIPTION OF THE DRAWINGS

FIG. 5 is an axial view, partially broken away, of a secondary seal taken in a plane indicated by line 5—5 of FIG. 7.

FIG. 6 is a fragmentary perspective view of the compliant spring per FIGS. 1, 5 & 7.

FIG. 7 is an enlarged fragmentary cross-sectional view of another embodiment of the invention.

FIG. 8 is an axial view, partially broken away, of a secondary seal taken in a plane indicated by line 8—8 of FIG. 3.

FIG. 9 is a fragmentary perspective view of the compliant spring per FIGS. 3 & 8.

FIG. 10 is an enlarged fragmentary cross-sectional view of one more embodiment of the invention.

FIG. 11 is an axial view, partially broken away, of a secondary seal taken in a plane indicated by line 11—11 of FIG. 10.

DESCRIPTION OF THE PREFERRED EMBODIMENTS

Figure 1:
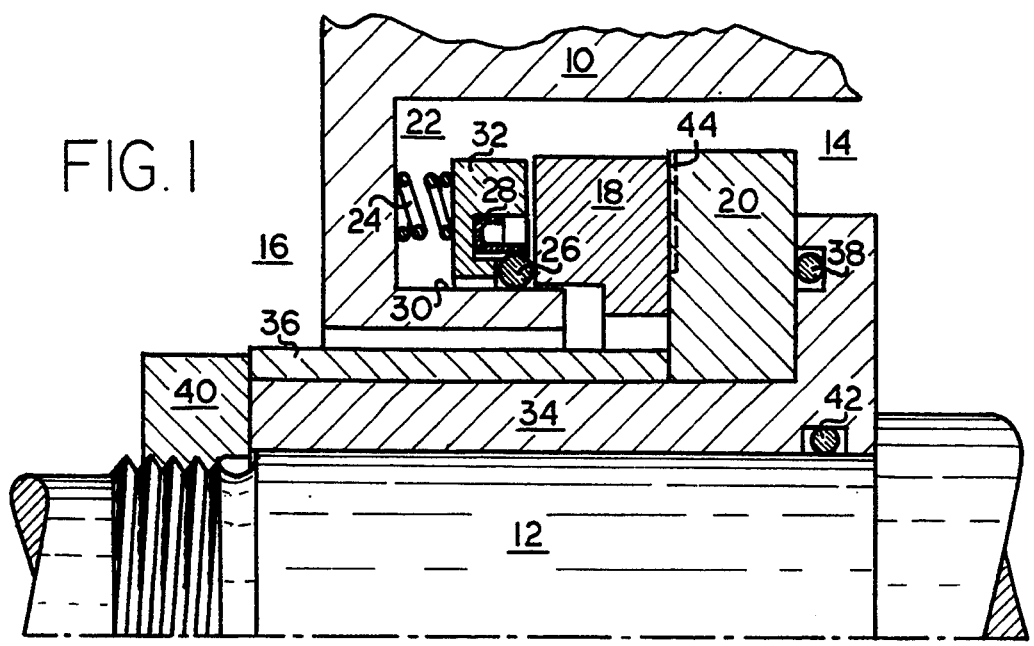
FIG. 1 is a cross-sectional view of a non-contacting seal, constructed in accordance with this invention, taken along the longitudinal axis thereof.

Referring first to FIG. 1, there is shown the invention and its environment. This environment comprises a housing 10 and a rotatable shaft 12, extending through said housing. The invention is applied to seal a fluid within an annular space 14 and to restrict its escape into the fluid environment at 16. The basic components of the invention comprise an annular, axially movable sealing ring 18 in a sealing relationship with an annular rotatable sealing ring 20. The sealing ring 18 is located within a cavity 22 of the housing 10 and held substantially concentric to the rotatable sealing ring 20. Between the housing 10 and the sealing ring 18 is a plurality of springs 24, spaced equidistantly around the cavity 22 of the housing 10. Springs 24 urge the sealing ring 18 into an engagement with the sealing ring 20. An O-ring 26 seals the space between the sealing ring 18 and the housing 10. The compliant spring 28 holds the O-ring 26 in contact with a cylindrical surface 30 of the housing 10. Compliant spring 28 is held within a disc 32, which acts also as a spacer, through which springs 24 transfer an axial force through the O-ring 26 to the sealing ring 18. While a C-shaped spring of unequal legs is shown, other arrangements with different spring shapes and forms may also be effective. The sealing ring 20 is retained in an axial position against a radial extension of the shaft sleeve 34 by a spacer sleeve 36. An O-ring seal 38 precludes leakage between the sealing ring 20 and the shaft sleeve 34. The shaft sleeve 34 is located axially against a step on the shaft 12 by a locknut 40, which is threaded on the shaft 12 as shown. An O-ring seal 42 precludes leakage between the shaft sleeve 34 and the shaft 12. In operation, the radially extending faces of the sealing ring 20 and the sealing ring 18 are in a sealing relationship, maintaining a very narrow clearance, generated by a shallow and concentric hydrodynamic groove pattern 44. The subject pattern has in many cases a shape of the logarithmic spiral. Pattern 44 can be electro-plated, etched or otherwise fabricated into the sealing ring 20 or alternatively into the sealing ring 18. Said narrow clearance prevents generation of friction heat and wear, yet limits the outflow of the sealed fluid, present at space 14.

Figure 2:
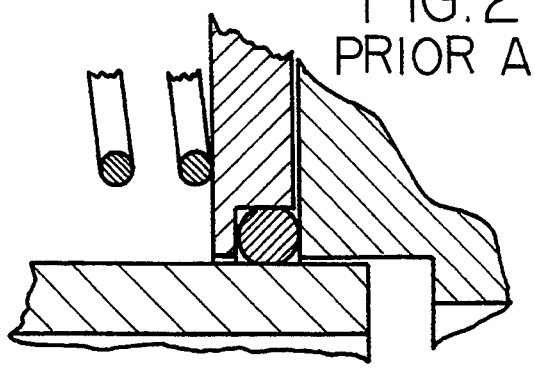
FIG. 2 is an enlarged fragmentary cross-sectional view of a secondary seal arrangement per prior art.

FIG. 2 shows an enlarged view of the secondary seal of the prior art design. It can be readily observed that there is no significant elasticity within the structure shown other than that of the O-ring itself. Such an O-ring therefore has to be squeezed radially to a dimension smaller than its narrowest cross-section, shown on the picture by flattened areas of the O-ring circumference on its top and bottom. This results in excessive squeeze where the O-ring is thicker, therefore in higher drag forces, resisting axial displacements.

Figure 3:
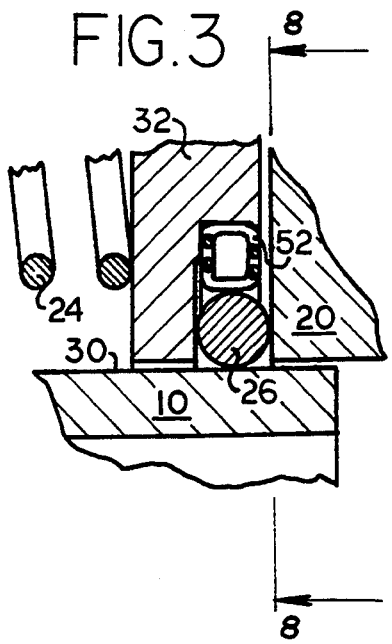
FIG. 3 is an enlarged fragmentary cross-sectional view of another embodiment of the invention.

FIG. 3 shows an enlarged view similar to FIG. 2 of another embodiment of the invention, where the compliant spring 52 has a form of a slanted wire spring as per FIGS. 3, 8 & 9.

Figure 4:
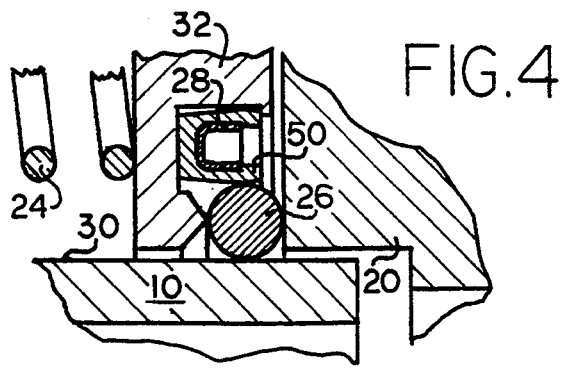
FIG. 4 is a view of yet another embodiment of the invention, similar to one per FIG. 3.

FIG. 4 shows another embodiment of the invention, where the compliant spring 28 is embed within a PTFE shield 50. The spring-energized PTFE sealing elements of above design are commercially available and would be combined with an O-ring to form an alternate embodiment of the invention.

FIG. 5 shows in an exaggerated fashion the local distortions of the compliant spring 28 due to the non-uniformity of the cross-section of the secondary 0-ring seal 26. The spring shown is one from flat stock per FIGS. 1, 6 & 7. Alternating slots 46 and 48 provide for local and circumferential flexibility.

FIG. 6 shows the compliant spring 28 in a perspective view. There are two kinds of slots made through the compliant spring 28. Slots 46 run completely through the inner longer leg of the compliant spring 28 and slots 48 run completely through the outer shorter leg of the compliant spring 28. Slots 46 and 48 are spaced alternately and evenly around the circumference of the compliant spring 28 to give it circumferential flexibility and an ability to comply locally with the secondary seal cross-section non-uniformities as shown in FIG. 5. The spring shown has straight legs of uneven length, but this is not critical for the proper function of the spring. Other similarly effective flat stock springs can be designed with even legs, curved legs, slots of varying geometries, and even springs of cross-sections other than those in the shape of the letter C.

FIG. 7 is an enlargement of the secondary seal per FIG. 1 with an additional spring element 54 for more compliance in the axial direction.

FIG. 8 shows an axial view of the slanted coil wire spring 52, taken along line 8—8 of FIG. 3. Slanted coils for this view give the spring the radial elasticity needed for the purpose of imposition of the compliant load on the secondary seal 26.

FIG. 9 shows the compliant wire spring 52 in the perspective view. The wire coils shown are nearly rectangular with rounded corners, but the coils could be also round or oval. The main factor is the angle A that coils assume to the longitudinal axis of the spring. With regular coil springs, this angle would be close to 90°, while here the angle A is less than about 60°, so that spring 52 would be squeezed radially between the disc 32 and the secondary seal 26 as shown at FIG. 8 for local compliance to cross-sectional changes of the secondary seal 26.

The above-described method of secondary seal loading eliminates the need to place the secondary seal into the radial, circumferentialy uniform gap of the prior art with the resulting excessive sliding friction. The same method can be applied also in the axial direction to deal with the axial secondary seal thickness non-uniformities, which are just as large as those in the radial direction. This would now be easier, because radial spring loading to this invention already minimizes axial non-uniformities. The prior art method of squeezing the secondary seal into a uniform gap caused the most squeeze in places of largest secondary seal thickness and this in turn caused widening of the secondary seal in the axial direction, largest in the very same places where the seal is too thick already. One can appreciate how this effect magnified cross-section non-uniformities in the axial direction. This is not the case with the spring method to this invention. Yet, should the ultimate compliance in the axial direction be desired, it is possible to increase axial penetration of the disc 32 into the secondary seal 26 by providing an edge contact as shown in FIG. 4. This way less axial force will be required for the same depth of penetration and elimination of non-uniformities will therefore require lesser axial force. Another way of increasing axial compliance is the above mentioned use of a spring in the axial direction, such as the formed spring 54 per FIG. 7, with alternating slots like those of the spring 28.

FIG. 10 shows one more embodiment of the invention, this one using an ordinary coil spring 56 in tension. Stretched spring 56 imposes inward pressure onto the secondary seal 26, pressing it into contact with the cylindrical surface 30 of the seal housing 10 with a known force.

FIG. 11 is a side view per section 11—11 of FIG. 10. Again, the force acting through coil spring 56 wires on the secondary seal 26 is relatively independent of its cross-section non-uniformities, such as the narrowing of the cross-section shown on the picture.

I claim:
1. Device for sealing a fluid at a space between a housing and a rotatable shaft, comprising:
 a first seal ring mounted on said shaft for rotation therewith and having a planar front sealing surface,
 a second seal ring being axially movable and substantially coaxial with said first seal ring,
 said second seal ring having a back surface and a planar front sealing surface defining a clearance with said first seal ring planar front sealing surface,
 a cylindrical surface of said housing, engaging coaxially said second seal ring,
 an elastic means connected between said housing and said second seal ring for biasing said second seal ring towards said first seal ring to close said clearance,
 one of said planar sealing surfaces having a plurality of grooves formed therein, said grooves arranged in spaced relation to each other,
 a disc positioned between said elastic means and said back surface,
 a secondary seal positioned between said disc and said back surface,
 said secondary seal being in sealing contact with said cylindrical surface and said back surface, said secondary seal being an elastomer-type O-ring, and
 a compliant spring means externally surrounding said secondary seal and biasing said secondary seal against said cylindrical surface, said spring means reacting radially outwardly against an inner annular surface of said disc.

2. Device according to claim 1, where said compliant spring means is a spring, formed from flat spring stock.

3. Device according to claim 1, where said compliant spring means is a C-shaped, spring-energized PTFE seal.

4. Device according to claim 1, where said compliant spring means is a slanted coil wire spring.

5. Device according to claim 2, where an axial spring means is mounted between said disc and said secondary seal.

6. Device according to claim 3, where said disc is shaped for an edge contact with said secondary seal.

* * * * *